United States Patent Office 2,810,676
Patented Oct. 22, 1957

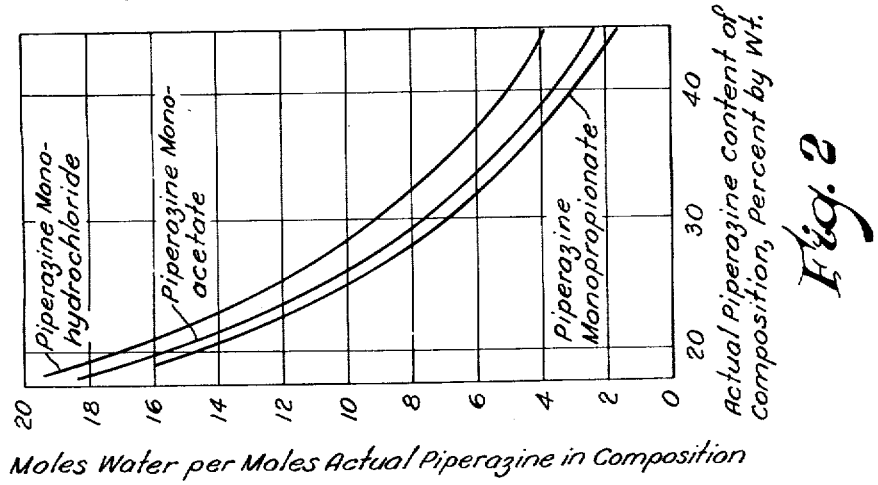
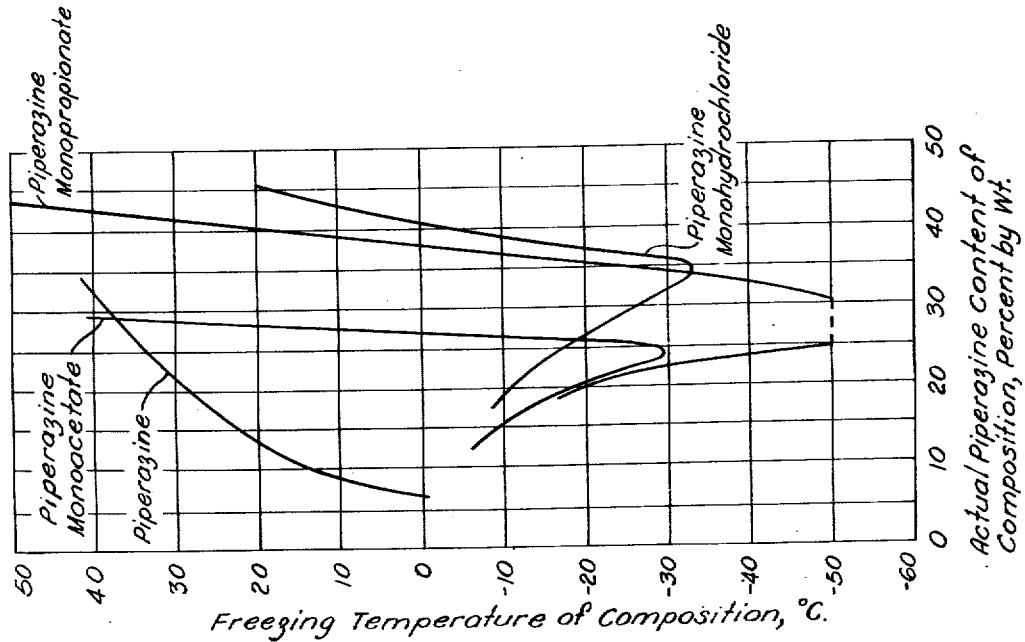

2,810,676

ANTHELMINTIC SOLUTIONS COMPRISING PIPERAZINE COMPOUNDS

Bartholdt C. Hadler and Earl L. Pelton, Midland, Mich., assignors to The Dow Chemical Company, Midland, Mich., a corporation of Delaware Application April 2, 1956, Serial No. 575,454

12 Claims. (Cl. 167—53)

Piperazine and many piperazine compounds are useful anthelmintic materials for deworming livestock and other domestic animals subject to filariasis. The citrate and adipate salts of piperazine, for example, are frequently used for such purposes. The employment of piperazine and its commonly utilized compounds in anthelmintic and other applications may, however, frequently be beset with practical difficulties and inconveniences. Usually, these are primarily due to the relatively low actual piperazine contents which are available in the conventionally employed forms of piperazine compositions. They may also be due to the inability of conventionally employed forms of piperazine compositions to be satisfactorily handled under many conditions of use. The actual piperazine content of crystalline piperazine citrate, by way of illustration, is only about 36 percent by weight while that of the adipate salt is only about 37 percent by weight. The maximum piperazine content of an aqueous piperazine solution at room temperature is in the neighborhood of about 20 percent by weight. In addition, the actual piperazine content of aqueous piperazine solutions is usually further diminished in use in order to meet commercial acceptance. Thus, various antifreeze materials, such as glycols, alcohols or glycerols, are sometimes incorporated in the compositions to prevent separation of the piperazine upon their exposure to cold. This is a matter of no small significance since wide employment of such compositions is made in relatively cold geographical areas.

This invention has reference to and has among its principal objectives the provision of aqueous compositions of piperazine compounds having relatively high actual piperazine contents and relatively low freezing points. It also relates to an advantageous method for the formation and preparation of such compositions.

According to the invention, aqueous compositions of piperazine compounds having an actual piperazine content of at least about 20 percent by weight and a freezing point less than about $-10°$ C. may expeditiously comprise and be prepared by formation of an aqueous solution consisting of about 1 mole of a piperazine compound selected from the group consisting of piperazine monohydrochloride, piperazine monopropionate, piperazine monoacetate, and mixtures thereof, and between about 3 and 18 moles of water.

The concentrated piperazine salt solutions of the present invention may advantageously have an actual piperazine content as high as about 40 percent by weight in a low freezing aqueous composition. Other compositions in accordance with the invention may have freezing points at least as low as $-50°$ C. with a high actual piperazine content in the neighborhood of 30-31 percent by weight. This is illustrated in Figure 1 of the accompanying drawing wherein the freezing temperature in degrees centigrade is plotted against the actual piperazine contents (and not the salt contents) in percentages by weight of aqueous solutions of piperazine monohydrochloride, piperazine monopropionate and piperazine monoacetate. For purposes of comparison, the freezing range of an aqueous solution of piperazine is also included in the graph of Figure 1. In Figure 2 there is graphically plotted the mole ratio of water to piperazine in the various compositions of the invention against their actual piperazine contents.

The compositions may be formed by several procedures in accordance with the invention. Thus, piperazine may be dissolved in water in a ratio of about 1 mole of piperazine to between about 3 and 18 moles of water and then acidified with about an equimolar proportion of an acid material selected from the group consisting of hydrochloric acid, propionic acid, acetic acid and mixtures thereof to thereby convert the dissolved piperazine to an aqueous solution of its mono salt. In some instances, especially when more concentrated compositions are being prepared, it may be necessary to warm the water to a sufficient piperazine-dissolving temperature before adding or incorporating the acid materials. The necessity for warming may easily be avoided, if desired, by the reverse procedure of incorporating the acid material in the water and subsequently adding the piperazine to the acid solution in order to accomplish the acidification.

In many cases it may be convenient and advantageous to merely melt a hydrated mass of piperazine, or a partially hydrated mass, or a mixture of hydrated, partially hydrated and anhydrous piperazine, or any combination thereof falling within the minimum mentioned mole ratios of piperazine to water, in order to form the piperazine solution before incorporation of the acid material. In such cases, adjustment of the water content may be made to a desired ratio if the water which is obtained from the hydrated form of piperazine is not present in a suitable amount. This may be accomplished by direct addition of water or by employment of appropriate aqueous solutions of the acid material.

In this connection, it may frequently be desirable to directly acidify a hydrated form of piperazine with the acid material in order to prepare the mono salt compositions of the invention. It is often possible in this manner to form suitable compositions in concentrated form by direct acidification of the starting piperazine material without necessitating a preliminary dissolving or melting step.

Suitable compositions may also be propitiously formed by directly mixing a piperazine di salt compound selected from the group consisting of piperazine dihydrochloride, piperazine dipropionate, piperazine diacetate and mixtures thereof with about equimolar proportions of piperazine and adding a sufficient quantity of water to obtain between about 3 and 18 moles of water to each mole of piperazine in the composition, or by forming an initial solution of either piperazine or the di salt in water and subsequently adding the equimolar proportion of the di salt or piperazine necessary to form the composition.

In many instances it may even be more advantageous to directly mix a hydrated form of piperazine with a piperazine di salt of the mentioned group to form a suitable composition which does not require further addition of water particularly when the hydrate has sufficient water present to provide at least about 3 moles of water for each mole of piperazine in the composition. Thus, by way of illustration, equimolar proportions of piperazine hexahydrate and piperazine dihydrochloride may be directly mixed together to form an aqueous solution comprising piperazine monohydrochloride and water in a mole ratio of about 1 to 3, respectively. Similar results may be obtained by mixing hydrated piperazine directly with its diisopropionate or diacetate salt or with mixtures of the di salts. The di salts may be in an anhydrous or hydrated form for such purposes.

In all cases the water content of the composition may be adjusted to any molar ratio with the piperazine that may be in accordance with the invention. The technique of mixing anhydrous piperazine with a hydrated di salt to prepare a composition in accordance with the invention is particularly convenient and expeditious for many purposes since it frequently permits suitable dissolved compositions to be prepared by merely intermixing dry starting ingredients.

While certain compositions in which the proportion of acid material to piperazine is less or greater than equimolar may be employed, it is not ordinarily preferable to do so since such compositions do not exhibit the beneficial features of having maximum actual piperazine contents in combination with low freezing characteristics. In addition the pH of the aqueous solutions of the piperazine mono salts is generally in the neighborhood of about 7.7. This is a further desirable characteristic of the compositions of the present invention. In addition to their lower actual piperazine contents and higher freezing points, aqueous solutions of piperazine may be objectionable in being too alkaline whereas aqueous solutions of piperazine di salts, which also freeze at substantially higher temperatures, may have an excessive acidity for many purposes. It is possible, however, and it is within the comprehension of the present invention, to provide compositions that may, for example, contain as much as 5 to 10 or more percent by weight, based on the weight of the mono salt that is present, of a di salt compound in the composition.

Advantageously a composition is prepared which comprises about one mole of piperazine monohydrochloride dissolved in about six moles of water. Such a composition has an actual piperazine content of about 37.3 percent by weight and a freezing point of about −23.5° C.

It is convenient to practice the invention according to batch-wise procedures using apparatus which is adapted for the purpose such as by being equipped with efficient stirring mechanisms and with heat exchanging means for heating when it may be required and for cooling to remove the heat of reaction which is generated during the reaction which may be performed in the manner of the various mentioned techniques. However, if it is preferred, the method can be conducted on a continuous basis by continuously passing appropriate forms of the reactant materials through a suitable reaction chamber or the like for the acidification or mono salt formation.

The invention is further illustrated in and by the following examples.

Example I

A piperazine monohydrochloride composition was prepared by dissolving about 172 grams of anhydrous piperazine in about 216 grams of water at a temperature of about 45° C. About 73 grams of gaseous hydrogen chloride was then passed into the solution with cooling to convert the piperazine to the salt. The composition had an actual piperazine content of about 37.3 percent by weight and a freezing point of about −23.5° C. Similar results may be obtained with anhydrous forms of propionic or acetic acid. When aqueous acid solutions are employed, account should be taken of the water which is thereby introduced in the composition.

Example II

About 194 grams (1 mole) of piperazine hexahydrate, which is a white solid at room temperatures, was placed in a balloon flask having a capacity of about 3 liters. Gaseous hydrogen chloride was then passed into the flask over the surface of the piperazine hexahydrate until a total of about one mole had been added. Considerable heat was evolved during the reaction, raising the temperature of the reaction mass to about 70° C. During the reaction, a solution of piperazine monohydrochloride was directly formed from the piperazine hexahydrate being acidified. The resulting solution, which was comprised of about one mole of piperazine monohydrochloride in about six moles of water had a specific gravity (corrected to 20° C.) of about 1.1250 and a pH of about 7.

Example III

Equimolar proportions consisting of about 87 grams of solid piperazine hexahydrate and 88.5 grams of solid piperazine dihydrochloride monohydrate were directly mixed in a 600 milliliter beaker at a temperature of about 25° C. The mixture first turned to a slurry while its temperature dropped to about 0° C. Upon rewarming of the slurry mixture to room temperature, a concentrated solution was formed having a pH between 7 and 8 which consisted of about one mole of piperazine monohydrochloride dissolved in about three and one-half moles of water.

The compositions which may be prepared by the method of the present invention have valuable anthelmintic properties and may also be used for other purposes for which such piperazine compounds are desired. Furthermore, they are more economical to obtain and prepare than are the ordinarily employed citrate and adipate salts of piperazine. In addition, they may be conveniently and safely handled and stored in concentrated form even at relatively low temperatures and, as aqueous solutions, are adapted to be dispensed readily for anthelmintic treatments as, for example, by incorporating them in the drinking water or food of the animals being treated.

What is claimed is:

1. A composition which comprises an aqueous solution consisting of about 1 mole of a piperazine compound selected from the group consisting of piperazine monohydrochloride, piperazine monopropionate, piperazine monoacetate and mixtures thereof and a total of between about 3 and 18 moles of water.

2. A composition in accordance with the composition set forth in claim 1 and being further characterized in having an actual piperazine content between about 20 and 40 percent by weight, a freezing point less than about −10° C. and a pH in the neighborhood of 7.7.

3. A composition which comprises an aqueous solution consisting of about 1 mole of piperazine monohydrochloride and a total of between about 3 and 18 moles of water and being further characterized in having freezing point characteristics in relationship to its actual piperazine content in accordance with the relationship plotted therefor in the graph in Figure 1 of the accompanying drawing.

4. A composition which comprises an aqueous solution consisting of about 1 mole of piperazine monopropionate and a total of between about 3 and 18 moles of water and being further characterized in having freezing point characteristics in relationship to its actual piperazine content in accordance with the relationship plotted therefor in the graph in Figure 1 of the accompanying drawing.

5. A composition which comprises an aqueous solution consisting of about 1 mole of piperazine monoacetate and a total of between about 3 and 18 moles of water and being further characterized in having freezing point characteristics in relationship to its actual piperazine content in accordance with the relationship plotted therefor in the graph in Figure 1 of the accompanying drawing.

6. A composition which comprises an aqueous solution of about 1 mole of piperazine monohydrochloride and a total of about 6 moles of water.

7. A method for the preparation of aqueous compositions of piperazine compounds having an actual piperazine content of at least about 20 percent by weight and a freezing point less than about −10° C. which comprises forming an aqueous solution consisting of about 1 mole of a piperazine compound selected from the group consisting of piperazine monohydrochloride, piperazine monopropionate, piperazine monoacetate and mixtures thereof, and a total of between about 3 and 18 moles of water.

8. A method in accordance with the method set forth in claim 7 wherein the aqueous solution of the piperazine compound is formed by reacting about one mole of piperazine dissolved in a total of between about 3 and 18 moles of water with about an equimolar proportion of an acid material selected from the group consisting of hydrochloric acid, propionic acid, acetic acid and mixtures thereof which is added to said solution of piperazine in water.

9. A method in accordance with the method set forth in claim 7 wherein the aqueous solution of the piperazine compound is formed by reacting about one mole of an acid material selected from the group consisting of hydrochloric acid, propionic acid, acetic acid, and mixtures thereof dissolved in a total of between about 3 and 18 moles of water with about an equimolar proportion, to the acid material, of piperazine which is added to the solution of the acid material in water.

10. A method in accordance with the method set forth in claim 7 wherein the aqueous solution of the piperazine compound is formed by directly reacting about one mole of piperazine in a hydrated form in which it is associated with a total of between about 3 and 18 moles of water of hydration with about an equimolar proportion, to the piperazine, of an acid material selected from the group consisting of hydrochloric acid, propionic acid, acetic acid and mixtures thereof.

11. A method in accordance with the method set forth in claim 7 wherein the aqueous solution of the piperazine compound is formed by reacting, in aqueous solution, about equimolar proportions of piperazine and a piperazine compound selected from the group consisting of piperazine dihydrochloride, piperazine dipropionate, piperazine diacetate and mixtures thereof, in which solution there is a sufficient quantity of water to provide a total of between about 3 and 18 moles of water to each mole of piperazine in the composition.

12. A method in accordance with the method set forth in claim 7 wherein the aqueous solution of the piperazine compound is formed by directly mixing about equimolar proportions of piperazine hexahydrate with a piperazine compound selected from the group consisting of piperazine dihydrochloride, piperazine dipropionate, piperazine diacetate and mixtures thereof to directly form a solution of a piperazine monosalt consisting of a total of between about 3 and 18 moles of water to each mole of piperazine in the composition.

References Cited in the file of this patent

Pollard: J. A. C. S., vol. 56, August 1934, pp. 1759 and 1760.

Disclaimer 2,810,676.—*Bartholdt C. Hadler*, and *Earl L. Pelton*, Midland, Mich. AN-
THELMINTIC SOLUTIONS COMPRISING PIPERAZINE
COMPOUNDS. Patent dated Oct. 22, 1957. Disclaimer filed Mar.
2, 1972, by the assignee, *The Dow Chemical Company*.
Hereby enters this disclaimer to claims 1 and 3 of said patent.
[*Official Gazette June 27, 1972.*]